United States Patent Office 3,658,886
Patented Apr. 25, 1972

3,658,886
PROCESS FOR THE MANUFACTURE OF ALIPHATIC ACRYLIC ACID ESTERS
Kurt Sennewald, Alfred Hauser, and Klaus Gehrmann, Knapsack, near Cologne, and Winfried Lork, Friesheim, near Lechenich, Germany, assignors to Knapsack Aktiengesellschaft, Knapsack, near Cologne, Germany
Filed Feb. 11, 1969, Ser. No. 798,329
Claims priority, application Germany, Feb. 17, 1968,
P 16 68 362.8
Int. Cl. C07c 69/54
U.S. Cl. 260—486 R 17 Claims

ABSTRACT OF THE DISCLOSURE

Production of aliphatic acrylic acid esters by oxidation of propylene and/or acrolein with oxygen in the presence of steam and inert gas, at a temperature between 300 and 600° C., in contact with a catalyst. Hot acrylic acid-containing reaction gas is scrubbed with a high boiler mixture, which is obtained as a by-product during the process and substantially consists of maleic acid ester, polyacrylic acids and polyacrylic acid esters, the resulting acrylic acid-containing extract is freed by distillative treatment from the low boilers water, acetic acid, acrolein and formaldehyde, and reacted later, in the presence of acid ion exchanger resins, with an aliphatic alcohol having from 1 to 8 carbons atoms, the resulting acrylic acid ester being distilled off and the high boiler mixture being recycled for scrubbing further acrylic acid-containing reaction gas.

---

Figure 1:
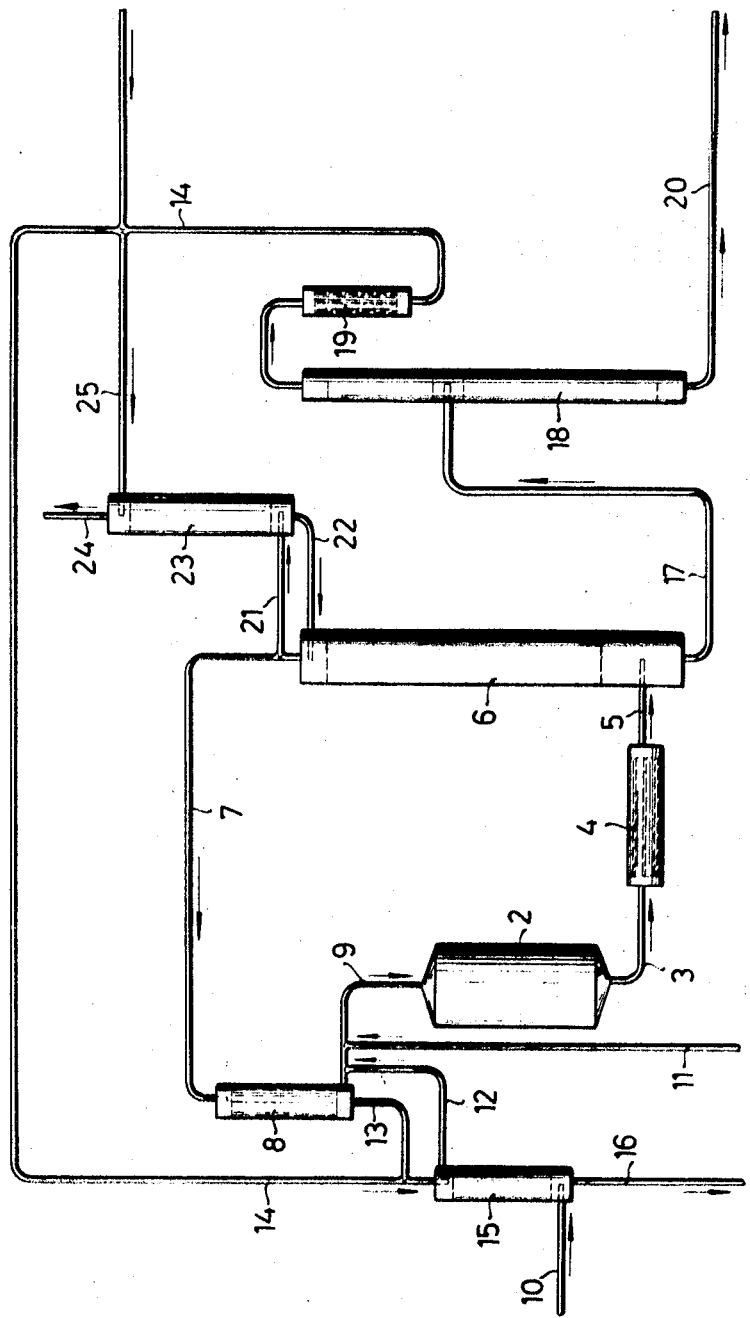

The present invention relates to the production of aliphatic acrylic acid esters from acrylic acid, such as that obtained by the oxidation of propylene or acrolein.

It is known that acrylic acid can be esterified with alcohol in contact with suitable catalysts. The acrylic esters, which are highly interesting monomeric components for making valuable polymers, are preferably produced in the liquid phase, anhydrous acrylic acid being reacted with an excess of alcohol in contact with acid catalysts and at elevated temperature. French Pat. 1,452,566 describes the esterification of acrylic acid, which is dissolved in acetophenone or tributyl phosphate, under the catalytic action of cation exchangers. It is also possible to esterify acrylic acid in the gas phase if desired, in the presence of steam, by the processes reported in German published specifications 1,161,259; 1,211,161 and 1,075,613, wherein a catalyst, such as concentrated sulfuric acid, silica gel or a ion exchanger resin, may be used.

These conventional processes for making acrylic acid esters are beset with considerable disadvantages. In the liquid phase process, it is necessary first to produce the anhydrous acrylic acid from frequently very dilute, aqueous solutions, using costly extraction and distillation methods, with regard to energy and apparatus. Particular difficulties are found to accompanying the recovery of pure acrylic acid from aqueous acrylic acid solutions, such as those which are obtained by the oxidation of propylene or acrolein and are contaminated with formaldehyde and acetic acid. The process described in French Pat. 1,452,566, wherein aqueous acrylic acid solutions are extracted using acetophenone or tributyl phosphate, and wherein the acrylic acid is esterified with an excess of alcohol, in the presence of the solvent, merely produces acrylic acid ester yields of less than 80%, referred to the acrylic acid present in the feed solution.

In those cases in which the esterification is carried out in the gas phase, it is necessary to either use pure acrylic acid or to vaporize the dilute, aqueous acid at the price of considerable energetic loss. Further difficulties which are occasioned by the extreme tendency of the unsaturated acids to undergo polymerization, result in yield reductions of more than 20%.

The present invention now provides a technically simple, economic and energetically favorable propylene or acrolein-based process for the production of acrylic acid esters in substantially better yields than those obtainable heretofore, which comprises first freeing reaction gas coming from the propylene or acrolein gas phase-oxidation from acrylic acid by absorbing it in a high-boiling organic solvent mixture which has been formed during the gas phase oxidation of propylene or acrolein and consists of the high-boiling by-products or their secondary products (maleic acid esters, polyacrylic acids and their esters). In addition to washing out acrylic acid and small amounts of water, the above absorption treatment enables a portion of low-boiling by-products, such as acrolein, formaldehyde and acetic acid as well as high boilers, such as maleic acid (cf. British specification 968,056, page 5, line 18) and polyacrylic acids to be washed out. While the reaction mechanism underlying the formation of $C_4$-compounds (maleic acid) from $C_3$-carbon compounds is unknown, it is certain that the polyacrylic acid is being formed during the condensation step. In conventional acrylic acid and acrylic acid ester-production processes, the so-called high boilers—the yield of polyacrylic acids and maleic acid is between about 1 and 3 mol percent, referred to the quantity of propylene or acrolein used—must normally be isolated and burnt. In the process of the present invention, however, the high boilers are used as a feed material for the high boiling absorbent, and to compensate losses of absorbent, which are occasioned by vaporization or hydrolysis.

The acrylic acid solution coming from the absorption column is worked up and the ester is produced by first distilling off the low boilers in a column operated under vacuum. In clear contrast with the aqueous phase process, the process of the present invention enables the organic acrylic acid solution to be freed by a one step operation from formaldehyde, acrolein, water and even acetic acid, which is so difficult to isolate under normal conditions, all without great expense with respect to apparatus. This is occasioned by the high boiling solvent which produces some sort of an attractive distillation that makes the low boilers concentrate in the distillate and simultaneously obviates spontaneous polymerization of the acrylic acid in the liquid phase.

The acrylic, maleic and polyacrylic acids contained in the high boiler mixture are simultaneously esterified, without any further purification, after addition of a suitable alcohol in the presence of acid cation exchangers. By the particular manner of carrying out the esterification reaction in the present process, it is ensured that the acids present in the high boiler mixture are substantially quantitatively transformed into their corresponding esters. The monomeric acrylic acid esters are isolated together with excess alcohol and esterification water by subjecting the high boiling solvent to distillation, and worked up later by known methods into pure acrylate, whereas the high boiler mixture is refluxed jointly with the maleic acid esters and polyacrylic acid esters formed during each passage, to the absorption column. It is here interesting to note that the polyacrylic acids are esterified partially only.

Figure 2:
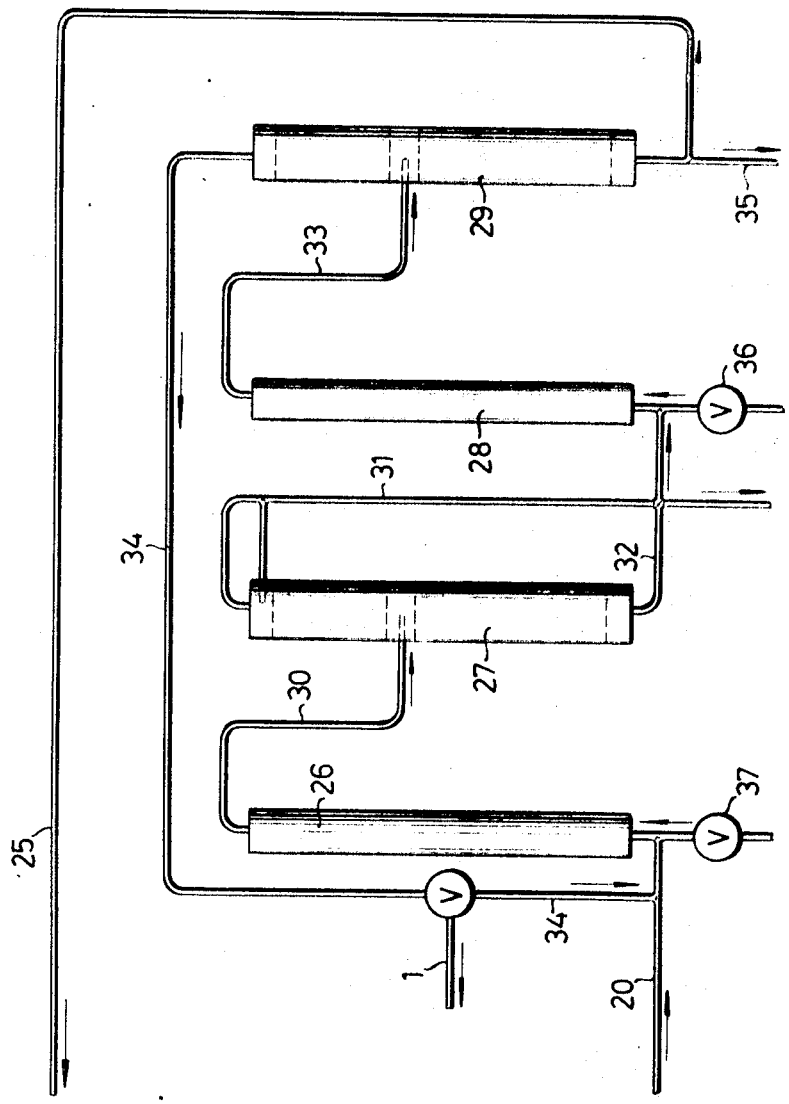

The process of the present invention will now be described with reference to the flow schemes shown in FIGS. 1 and 2 of the accompanying drawings. In accordance with a preferred variant of the present process, reactor 2 is fed with propylene or acrolein which is oxidized in conventional manner by means of oxygen into acrylic acid, the oxidation being carried out in the presence of a dilution gas, such as steam, nitrogen and/or carbon oxides, at a temperature between 300 and 600° C. and in contact with a catalyst. The oxidation is not limited to the use of a specific type of catalyst, and substantially all acrylic acid-forming catalysts can be used therein, namely mixtures comprised of oxides of one or more of the elements bismuth, cobalt, molybdenum, calcium, barium, cerium, vanadium, chromium, tungsten, manganese, rhenium, iron, nickel, copper, silver, gold, silicon, tin, lead, phosphorus, arsenic, antimony, sulfur, zinc and tellurium. More particularly, the propylene oxidation is generally carried out in contact with conventional bismuth molybdate catalysts, and the acrolein oxidation is preferably carried out in contact with conventional cobalt molybdate catalysts, which contain further activators, such as oxides of calcium, barium, cerium, vanadium, chromium, tungsten, manganese, rhenium, iron, nickel, copper, silver, gold, silicon, tin, lead, phosphorous, arsenic, antimony, sulfur, zinc and tellurium. The catalysts may be deposited on customary carriers including silicic acid, silica gel, diatomaceous earth, kieselguhr, aluminum oxide, aluminum phosphate, aluminum silicate, pumice, silicon carbide or material. While condensation of gaseous constituents is avoided, the hot reaction gas, which has a temperature between 300 and 600° C., contains acrylic acid plus unreacted propylene and/or acrolein as well as steam, acetic acid, formaldehyde, hydrogen and inert gas ($N_2$, CO and $CO_2$) as well as small proportions of polyacrylic acids, maleic acid or their anhydrides, is conveyed through line 3 to coller 4 and cooled therein by indirect cooling down to a temperature between 90 and 200° C., preferably between 100 and 170° C. The cooled reaction gas then travels through line 5 to absorption column 6, which may be a packed column or a bubble tray column.

High boiling absorbent flowing through line 22 is supplied to the head of column 6 to wash the reaction gas and isolate the acids contained therein, which include acrylic acid as their principal constituent.

The high boiling absorption is a mixture, which consists of the maleates, low molecular weight polyacrylic acids and their esters, formed during the process itself, and is used at a rate sufficient to produce an extract with an acrylic acid content between about 2 and 50%, preferably between 10 and 30% by weight. To this effect, it is generally advantageous to use between 100 and 1000 milliliters absorbent per normal cubic meter (measured at N.T.P.) reaction gas.

Substantially acrylic acid-free residual gas issues near the head of the absorption column, through line 7. This residual gas, which contains propylene and/or acrolein, oxygen, hydrogen, steam, formaldehyde and inert gases, is conveyed to gas cooler 8, wherein it is indirectly cooled to condense out reaction water in excess, small proportions of acrolein and the bulk of formaldehyde formed during the process, which are introduced into line 13. The pressure and temperature near the head of absorption column 6 and cooler 8 depend on the steam partial pressure desired to prevail in the fresh gas mixture. For example, the corresponding values may be as high as up to 5 atmospheres absolute, and between about 20 and 90° C., for the preferred operation at atmospheric or slight overpressure.

Steam-saturated residual gas, which is used as cycle gas, is recycled through line 9 to oxidation reaction 2, together with fresh oxygen coming from line 11. Fresh propylene or acrolein is supplied through line 10 and stripping column 15, which is operated at 30 to 90° C. and in which the condensate accumulating in cooler 8 and flowing off through line 13 is freed from small amounts of dissolved acrolein. The acrolein-containing propylene or acrolein in vapor form is introduced into the cycle gas, through line 12.

In order to maintain the quantity of cycle gas constant, a small proportion of residual gas which substantially contains carbon monoxide and dioxide formed in situ during each passage, is withdrawn through line 21, scrubbed in scrubbing zone 23 with fresh high boiler mixture coming from line 25, to recover the acrolein therein, and supplied later through line 24 to a combustion zone. The acrolein-containing high boiler mixture is conveyed through line 22 to the head of absorption column 6, as already described hereinabove.

Base product obtained in absorption column 6, which is a solution of all of the acrylic acid, water, acetic acid and small amounts of formaldehyde and acrolein as well as of maleic acid and polyacrylic acids in the high boiling extractant, is fed through line 17 to a first distilling column 18 and distilled therein. In order to obviate a thermally promoted polymerization of the acrylic acid, the low boilers are isolated by distillation under vacuum within the preferred range between 10 and 200 mm. mercury, corresponding to a boiling point of the distillate between 20 and 100° C.

Column 18 may be, for example, a packed column or bubble tray column having between 10 and 30 theoretical trays each in its expelling and concentrating portions. The practically quantitative separation of the low boilers (acrolein, formaldehyde, water and acetic acid) is ensured at a minimum reflux ratio of 2, preferably 3 to 6.

The distillate, which substantially consists of water and acetic acid, is condensed in cooler 19 to be conveyed then through line 14 to stripping column 15 for the purpose of recovering dissolved acrolein, which is combined through line 12 with the cycle gas, and finally withdrawn through line 16 together with formaldehyde-containing water of condensation, coming from line 13.

In order to avoid acrylic acid polymerization during the work up of reaction gas issuing from reactor 2 and distilling the high boiler extract in column 18, the high boiler mixture should conveniently be used in combination with a known stabilizer for acrylic acid, such as methylene blue, phenothiazine, pyrogallol, p-tertio-butyl pyrocatechol, copper acetate, acrylate or oleate, which is added at a rate between 0.001 and 0.1%.

The acids (acrylic acid, polyacrylic acid, maleic acid) dissolved in the high boiler mixture are esterified using $C_1$ to $C_3$-alcohols (methanol, ethanol, propanol). To this effect, as shown in FIG. 2, the hot high boiler mixture is mixed in line 20 with very dilute alcoholic acrylate solution, which is recovered in post-esterification zones 29 und 28 and removed through line 34, and the mixture is conveyed to a first esterification reactor (ion exchange column) 26. The esterification, which is effected within a temperature range between 30 and 130° C., preferably at or below the boiling point of the acrylate/alcohol-azeotrope obtained in each particular case, calls for the presence of an acid catalyst, which is a commercially readily available cation exchanger of the Lewatite, Amberlite or Dowex types. 0.2 to 5 liters, preferably 0.75 to 3.5 liters ion exchanger resin, which may be used in the form of a solid bed or flow bed, are employed per mol acrylic acid. After having been passed through the reactor, in which between about 60 and 95% of the acids are esterified, the mixture is conveyed through line 30 to a second distilling column 27, and distilled under atmospheric pressure. The head product obtained in line 31 is an alcoholic acrylate solution, which contains the reaction water formed in situ during the esterification, and which is worked up in known fashion into pure acrylate, by either extractive distillation or extraction with water.

The base product of column 27, which still contains free acids, is withdrawn through line 32, mixed with fresh alcohol coming from line 36 and esterified in the post-esterification zone, under conditions the same as those used in the principal esterification zone. The post-esterification zone is formed of a second ion exchange column 28, connection line 33 and a third distilling column 29. The practically quantitative conversion for the acids is ensured given that 1.2 to 8 mols, preferably 1.5 to 6 mols alcohol are used per mol acid, which is supplied through line 20. The head product of column 29 is conveyed through line 34 to the principal esterification zone, whereas the high boiler mixture (maleate, polyacrylic acids, polyacrylates) is removed from the column base and delivered through line 25 to scrubbing zone 23. Concentration of high boilers in the installation is obviated by removal of a portion of the high boiler mixture through line 35, which is distilled in a separate installation (not shown in the drawing) to free it from undistillable residues, and which can be recycled to the principal installation, when necessary or convenient.

The esterification of the acrylic acid and polyacrylic acids with alcohols capable of forming an azeotrope with water and eliminating water by azeotropic distillation ($C_4$ to $C_8$-alcohols) is carried out in modified manner, but inside the same esterification apparatus. To his effect, the $C_4$ to $C_8$-alcohol, for example n-butanol, is added through line 37 to the acrylic acid solution travelling through line 20, the alcohol being added at a rate of 1.2 to 8 mols, preferably 1.5 to 6 mols, per mol acrylic acid. Under the conditions already described hereinabove, the esterification mixture is conveyed through the first ion exchange column 26 and introduced later through line 30 into the second distilling column 27. The head product of column 27, which is comprised of the water/alcohol-azeotrope, for example n-butanol with 43% water, is condensed. After phase separation, the organic phase is refluxed to column 27 and the aqueous phase, which contains some dissolved alcohol, is withdrawn through line 31 and worked up into pure alcohol, if desired. The anhydrous base product of column 27 is supplied to the second ion exchange column 28, to complete the esterification and, after it has been passed through the second reactor at elevated temperature, it is separated in the following third distilling column 29 into a head product, which consists of an alcoholic solution of the corresponding acrylate and into a high boiler mixture. The acrylate solution can be removed through lines 34 and 1 and worked up in known fashion into pure acrylate, whereas the base product is returned through line 25 to scrubbing zone 23 to serve as a high boiling extractant therein.

The present process for the manufacture of acrylic acid esters offers considerable advantages over the prior art.

For example, the present process enables the production of acrylic acid esters using the inexpensive petrochemical raw material propylene or acrolein obtainable therefrom, and oxygen as feed material, the acrylic acid ester yields being merely a function of the type of catalyst used in the oxidizing step. The absorbents needed for the production of acrylic acid in the gas phase, and the steam needed for carrying out the propylene oxidation, are produced during the process itself. The distillative removal of formaldehyde and acetic acid in the present process permits obviating the otherwise necessary complicated isolation of contaminants by countercurrent extraction with water, the quantity of water needed in the process, and required to be purified being reduced to a minimum.

The present invention relates more particularly to a process for the production of aliphatic acrylic acid esters by reaction of propylene and/or acrolein with oxygen in the presence of steam and inert gas, at a temperature between 300 and 600° C., in contact with a catalyst, and esterification of the resulting acrylic acid with aliphatic alcohols, which process comprises scrubbing the hot acrylic acid-containing reaction gas with a high boiler mixture, which is obtained as a by-product during the process and substantially consists of maleic acid ester, polyacrylic acids and polyacrylic acid esters; freeing the resulting acrylic acid-containing extract by distillative treatment from the low boilers water, acetic acid, acrolein and formaldehyde, and reacting the extract in the presence of acid ion exchanger resins with an aliphatic alcohol having from 1 to 8 carbon atoms; distilling off the resulting acrylic acid ester and recycling the high boiler mixture for scrubbing further acrylic acid-containing reaction gas.

A preferred variant of the process of the present invention comprises cooling the reaction gas, which comes from the propylene or acrolein oxidation, has a temperature between 300 and 600° C. and contains acrylic acid plus acrolein, acetic acid, formaldehyde, oxygen, inert gas, steam, maleic acid, polyacrylic acids and possibly propylene, down to a temperature between 90 and 200° C. while avoiding condensation of gaseous constituents, and scrubbing the cooled reaction mixture in countercurrent fashion with the high boiler mixture in an absorption column, at a temperature between 20 and 90° C.: introducing into a first distilling column the high boiler extract, which contains acrylic acid, water, acetic acid, maleic acid, polyacrylic acids and small amounts of acrolein and formaldehyde, and freeing it therein under reduced pressure from the low boilers water, acetic acid, acrolein and formaldehyde; mixing the high boiler extract, which still contains acrylic acid, maleic acid and polyacrylic acids, with an acrylic acid ester-containing $C_1$ to $C_3$-alcohol and passing the resulting mixture through a first reactor heated to a temperature between 30 and 130° C. and charged with 0.2 to 5 liters of an acid ion exchanger resin, per mol acrylic acid; distilling the resulting esterification mixture in a second distilling column; removing an acrylic acid ester/alcohol/water-mixture overhead and working it up in conventional manner into pure methyl, ethyl or propyl acrylate; removing, near the base of the second distilling column, a mixture consisting of the high boilers maleic acid, maleic acid ester, polyacrylic acids, polyacrylic acid esters and residual acrylic acid; combining the said mixture with 1.2 to 8 mols of a pure $C_1$ to $C_3$-alcohol per mol acrylic acid leaving the first distilling column, and introducing the combination into a second reactor having the same ion exchanger resin as the first reactor therein; distilling the resulting esterification mixture in a third distilling column; removing acrylic acid ester-containing alcohol overhead and combining it with the high boiler extract coming from the base of the first distilling column and containing acrylic acid, maleic acid and polyacrylic acids; and removing, near the base of the third distilling column, residual high boiler mixture, which is comprised of maleic acid ester, polyacrylic acids and polyacrylic acid esters and of which the quantity is increased during the process, for scrubbing the acrylic acid-containing reaction gas in the absorption column.

A further embodiment of the present process relates to the production of acrylic acid esters, having from 4 to 8 carbon atoms in the alcoholic component and comprises mixing the high boiler extract, which comes from the base portion of the first distilling column and contains acrylic acid, maleic acid and polyacrylic acids, with 1.2 to 8 mols of a $C_4$ to $C_8$-alcohol, per mol acrylic acid, and passing the resulting mixture through the first reactor charged with the ion exchanger resin; distilling the resulting esterification mixture in the second distilling column; removing a water/alcohol-azeotrope overhead, condensing it, separating the aqueous phase from the organic phase, and refluxing the organic phase to the second distilling column; withdrawing, near the base portion of the second distilling column, an anhydrous mixture comprised of the high boilers maleic acid esters, polyacrylic acids, polyacrylic acid esters and alcohol, acrylic acid esters and residual acrylic acid, and introducing the said anhydrous mixture into the second reactor charger with the ion exchanger resin; distilling the esterification mixture in the third distilling column; removing an alcoholic acrylic acid ester solution overhead and working it up in conventional manner into pure acrylic acid ester having from 4 to 8 carbon atoms in its alcoholic component; withdrawing, near the base portion of the third distilling column, the high boiler mixture, the quantity of which is increased during the process, and using it for scrubbing acrylic acid-containing reaction gas in the absorption column.

About 3 to 20% by weight of all of the high boilers should be conveniently withdrawn from the high boiler cycle near the base portion of the third distilling column, and freed by distillative treatment from undistillable residues, the high boiler distillate being combined again with the high boiler cycle. The hot, acrylic acid-containing reaction gas is preferably scrubbed using from 0.1 to 1 liter high boiler mixture per normal cubic meter gas.

Residual gas, which substantially consists of unreacted propylene and/or acrolein, unreacted oxygen, steam, formaldehyde, hydrogen, carbon monoxide and carbon dioxide, and remains unabsorbed by the high boiler mixture in the absorption column, can be introduced into a cooler, wherein reaction water in excess and formaldehyde are condensed out, the balance gas being then recycled as a steam-saturated cycle gas and in combination with fresh oxygen and fresh propylene and/or acrolein to the catalyst-charged oxidation reactor.

A small portion—corresponding to the quantity of additional carbon oxides forming during each passage—of residual gas can be withdrawn at a place above the absorption zone, freed from acrolein by scrubbing it with the high boiler mixture, the acrolein-free gas balance portion being burnt and the high boiler mixture being refluxed to the head of the absorption column.

The low boiler mixture, which consists of water/acetic acid/acrolein/formaldehyde and is distilled off in the first distilling column, can be condensed to be supplied then to a stripping column, which is fed with fresh propylene and/or acrolein and in which the acrolein is expelled at 30 to 90° C. to be combined later, if desired together with propylene, with the cycle gas, the remaining low boiler constituents being withdrawn from the stripping column.

The reaction water in excess, which is condensed out from the residual gas together with formaldehyde and possibly small amounts of acrolein, can be combined with the low boiler mixture, which is distilled off from the first distilling column and condensed, and the resulting combination can be conveyed to the stripping column.

EXAMPLE 1

1300 cc. of a catalyst with the composition $Ag_{0.12}Fe_{1.1}Bi_{0.3}Mo_{12}P_{0.1}O_{31.44}$, compressed into tablets 5 mm. wide, were placed in a U-shaped steel reactor 2, 32.5 mm. wide, and heated to 408° C. by means of an electrically heated salt bath. 2.88 normal cubic meters/hr. cycle gas composed initially of 80% by volume nitrogen and 20% by volume steam was passed over the catalyst. After having been heated in small stripping column 15, the cycle gas was mixed, per hour, with 142 grams (3.38 mols) propylene and with a quantity of oxygen sufficient to produce a fairly constant composition (after removal of the nitrogen) of:

Percent by volume

| | |
|---|---|
| Propylene | 5.3 |
| Oxygen | 6.1 |
| Acrolein | 7.0 |
| Steam | 18.5 |
| $CO_2$ | 31.1 |
| CO | 31.0 |
| and Balance gas ($H_2$, $C_2H_4$ and similar gases) | 1.0 | in the cycle gas before the reactor (fresh gas mixture).

The hot reaction gas with a mean acrylic acid-content of about 1.5% by volume left reactor 2 after a mean sojourn time of about 0.8 second. It was cooled down to a temperature of 140° C. and conveyed to a bubble tray column 6, 100 mm. wide and having 25 trays therein. The reaction gas was further cooled down to 70° C. and scrubbed in countercurrent fashion by the addition, per hour, of 435 grams high boiler mixture consisting of about 93% by weight dimethyl maleate and about 7% by weight polyacrylic acid and polyacrylates, which was conveyed through off-gas wash tower 23 to the head of absorption column 6. In warm water-cooled heat exchanger 8, the acrylic acid-free residual gas was further cooled down to 64° C., and about 100 grams reaction water in excess containing 6% formaldehyde were found to condense out. This formaldehyde solution was freed in stripping column 15 at 50° C. from traces of dissolved acrolein, using fresh propylene, and withdrawn later from the cycle, through line 16. After the addition of acrolein-containing fresh propylene through line 12 and oxygen through line 11, the steam-saturated residual gas was conveyed as cycle gas with the above composition to reactor 2, through line 9.

In order to maintain the quantity of cycle gas constant, about 75 liter residual gas with CO and $CO_2$ as its principal constituents were removed, per hour, through lines 21 and 24, after the acrolein had been washed out by means of the high boiler mixture, in off-gas scrubbing zone 23.

The hot acrylic acid solution obtained in the base of absorption column 6 was supplied to low boiler distilling column 18 packed with stainless steel spirals, 4 mm. wide. The column was 30 mm. wide and 2.40 meters long. The acrylic acid solution was supplied at a place below the first upper third of column 18, and a dilute phenothiazine solution was fed to the head of the column. This was done so as to maintain a constant stabilizer content of 0.1% by weight in the high boiler solution. At a reflux ratio of 4 and under a vacuum of 60 mm. mercury near the column head, it was possible to withdraw an about 16% aqueous acetic acid, which was found to contain small amounts of acrolein and formaldehyde. The acrolein was expelled by means of propylene, again by heating it in stripping column 15, and was combined with the cycle gas, through line 12.

A solution, which contained about 25% acrylic acid plus between about 3 and 4% maleic acid and polyacrylic acids, was delivered from the base of low boiler column 18, through line 20. It was mixed with 343 grams of an about 4% methanolic methyl acrylate solution, which travelled through line 34 and was produced in post-esterification installation (28, 29). The batch to undergo esterification was then passed at a temperature of 65° C. through a cation exchange column 26 of the Lewatite S 100 type with a volume of 1.5 liters. The reaction product was distilled in column 27 at atmospheric pressure and gave, per hour, 167 grams (1.94 mols) methyl acrylate in the form of an about 36% methanolic solution which also contained about 8% water. The methyl acrylate was obtained in a yield of 57.4%, referred to the propylene used. The acrylic acid, which was contained in the reaction gas and extracted almost quantitatively therefrom, was found to undergo substantially quantitative esterification.

The base product of the acrylate distillation 27, which consisted substantially of the high boiler mixture, still contained between about 2 and 3% unreacted acrylic acid. After the addition, per hour, of 334 grams (10.45 mols) fresh methanol through line 36, the acrylic acid was practically completely transformed in a following post-esterification installation comprising a cation exchange column 28 and a distilling column 29. The distillation produced an about 4% methanolic methyl acrylate solution, which was fed to the principal esterification zone (26, 27), through line 34.

The base product of distilling column 29 (high boiler mixture) was refluxed to the head of off-gas wash tower 23, through line 25, after removal, per hour, of 3 grams undistillable residue, through line 35.

EXAMPLE 2

114 grams/hr. (2.71 mols) propylene were oxidized in the gas phase under the conditions reported in Example 1 with the use of oxygen and in contact with a catalyst having the composition $$Ag_{0.12}Fe_{1.1}Bi_{0.3}Mo_{12}P_{0.1}O_{31.44}$$

The resulting reaction gas was found to contain about 1.2% by volume acrylic acid. After having been cooled down to 140° C., the gas was scrubbed in countercurrent fashion, at about 70° C., in absorption column 6 with about 400 grams of a high boiler mixture consisting of about 97% by weight dibutyl maleate and about 3% by weight polyacrylic acids and polyacrylates. Acrylic acid-free residual gas was freed in heat exchanger 8 from reaction water in excess and formaldehyde, combined with fresh propylene and oxygen, and the combination was returned to reactor 2. A hot acrylic acid solution with a total acid content of about 25% by weight was found to accumulate in the base portion of column 6. It was vacuum distilled under a pressure of 60 mm. mercury in low boiler column 18 described hereinabove and thereby freed from formaldehyde, acrolein, water and acetic acid to be mixed later in line 20 with 433 grams (5.85 mols) n-butanol, coming from line 37. The esterification mixture was conveyed at 75° C. through a cation exchange reactor 26 which contained 1.5 liters Lewatite S 100. The water of esterification (about 18 grams) formed in reactor 26 was distilled off by azeotropic distillation with butanol in packed column 27 under a pressure of 600 mm. mercury and at 83° C., and withdrawn through line 31, after the phases had been separated from each other and the organic phase had been refluxed to the head of column 27. To complete the reaction, the esterification mixture obtained as the base product of column 27 was conveyed at 75° C. through a second ion exchange reactor 28 of the same type as the first reactor. The reaction product coming from reactor 28 was distilled in packed column 29 under a pressure of 60 mm. mercury. A butanolic solution containing 35% by weight butyl acrylate was obtained as the distillate (B.P. between 40 and 43° C.) through lines 34 and 1 at a rate of 507 grams per hour. Butyl acrylate was obtained in a yield of 51.2%, referred to the propylene used. The solution which still contained small amounts of acrylic acid and water, was worked up in conventional manner into pure butyl acrylate.

The base product of column 29 (high boiler mixture) was refluxed through line 25 to off-gas wash tower 23, after it had been freed earlier from about 6 grams of undistillable residue.

EXAMPLE 3

660 milliliters of a lumpy cobalt molybdate catalyst with the composition $CoMoO_4$, placed in a U-shaped steel reactor 25 mm. wide, were heated to a temperature of 370° C. and 2.06 normal cubic meters/hr. cycle gas, whose composition was maintained constant by the addition of 157 grams/hr. (2.8 mols) acrolein and the corresponding quantity of oxygen, were passed over the catalyst. The cycle gas was more particularly composed of:

| | Percent of volume |
|---|---|
| Acrolein | 8.7 |
| Oxygen | 4.5 |
| $CO_2$ | 37.8 |
| CO | 28.9 |
| Steam | 19.3 |
| Balance gas ($N_2$, $C_2H_4$, $H_2$ and similar gases) | 0.8 |

The reaction gas which contained about 2.5% by volume acrylic acid, left reactor 2 after a mean sojourn time of about 0.6 second and was cooled down to 130° C. In tray column 6, it was scrubbed in countercurrent fashion, at 70° C. and under the conditions reported in Example 1, using 490 grams of a high boiler mixture comprised of about 93% by weight dimethyl maleate and about 7% by weight polyacrylic acids and polyacrylates. The acid-free residual gas coming from absorption column 6 was worked up and returned to reactor 2 under the conditions described in Example 1, after the addition of fresh oxygen and acrolein. 24 liters/hr. issuing gas were simultaneously removed through line 24, after they had been freed from acrolein in off-gas scrubbing zone 23.

The low boilers water, formaldehyde, residual acrolein and acetic acid were distilled off in column 18 through line 14 in a manner analogous to that described in Example 1, and the high boiler solution, which was obtained in the base portion of low boiler distilling column 18 and contained about 25% by weight acrylic acid plus 3 to 4% by weight maleic acid and polyacrylic acids, was esterified in a manner analogous to that described in Example 1. Fresh methanol (432 grams=13.5 mols) was added through line 36, following the first esterification step. The distillation gave 583 grams/hr. of a 33.2% methanolic methyl acrylate solution. The methyl acrylate was obtained in a yield of 80.3%, referred to the acrolein used. The high boiler mixture was freed from undistillable residue and refluxed then in the manner described in the preceding examples.

We claim:

1. In a process for the production of aliphatic acrylic acid esters by oxidation of propylene and/or acrolein with oxygen in the presence of steam and inert gas, at a temperature between 300 and 600° C., in contact with a catalyst and by esterification of the resulting acrylic acid with aliphatic alcohols, the improvement which comprises scrubbing hot acrylic acid-containing reaction gas with a high boiler mixture, which is obtained as a by-product during the process and substantially consists of maleic acid ester, polyacrylic acids and polyacrylic acid esters; freeing the resulting acrylic acid-containing extract by distillative treatment from the low boilers water, acetic acid, acrolein and formaldehyde, and reacting the extract in the presence of acid ion exchanger resins with an aliphatic alcohol having from 1 to 8 carbon atoms; distilling off the resulting acrylic acid ester and recycling the high boiler mixture for scrubbing further acrylic acid-containing reaction gas.

2. The process of claim 1, wherein acrylic acid esters having from 1 to 3 carbon atoms in the alcoholic component are produced, comprising cooling the reaction gas which comes from the propylene or acrolein oxidation zone, has a temperature between 300 and 600° C. and contains acrylic acid plus acrolein, acetic acid, formaldehyde, oxygen, inert gas, steam, maleic acid and polyacrylic acids, down to a temperature between 90 and 200° C. while avoiding condensation of gaseous constituents, and scrubbing the cooled reaction gas in countercurrent fashion with the high boiler mixture in an absorption zone, at a temperature between 20 and 90° C.; introducing into a first distilling zone the high boiler extract, which contains acrylic acid, water, acetic acid, maleic acid, polyacrylic acids and small amounts of acrolein and formaldehyde, and freeing it therein under reduced pressure from the low boilers water, acetic acid, acrolein and formaldehyde; mixing the high boiler extract, which still contains acrylic acid, maleic acid and polyacrylic acid, with an acrylic acid-containing $C_1$ to $C_3$-alcohol and passing the resulting mixture through a first reaction zone heated to a temperature between 30 and 130° C. and charged with 0.2 to 5 liters of an acid ion exchanger resin, per mol acrylic acid; distilling the resulting esterification mixture in a second distilling zone; removing an acrylic acid ester/alcohol/water-mixture overhead and working it up into pure methyl, ethyl or propyl acrylate; removing, near the base of the second distilling column, a mixture comprised of the high boilers maleic acid, maleic acid ester, polyacrylic acids, polyacrylic acid esters and residual acrylic acid; combining the said mixture with 1.2 to 8 mols pure $C_1$ to $C_3$-alcohol, per mol acrylic acid coming from the first distilling zone, and introducing the combination into a second reaction zone having the same ion exchanger resin as the first reaction zone therein; distilling the resulting esterification mixture in a third distilling zone; removing acrylate-containing alcohol overhead and combining it with the high boiler extract coming from the base portion of the first distilling zone and containing acrylic acid, maleic acid and polyacrylic acids; and removing, near the base of the third distilling zone, residual high boiler mixture, which is comprised of maleic acid ester, polyacrylic acids and polyacrylic acid esters and of which the quantity is increased during the process, for scrubbing acrylic acid-containing reaction gas in the absorption column.

3. The process of claim 1, wherein acrylates having from 4 to 8 carbon atoms in the alcoholic component are produced, comprising cooling the reaction gas coming from the propylene or acrolein oxidation zone, which has a temperature between 300 and 600° C. and contains acrylic acid plus acetic acid, acrolein, formaldehyde, oxygen, inert gas, steam, maleic acid and polyacrylic acids, down to a temperature between 90 and 200° C. while avoiding condensation of gaseous constituents, and scrubbing the cooled reaction gas in countercurrent manner with the high boiler mixture in an absorption zone, at a temperature between 20 and 90° C.; introducing into a first distilling zone the high boiler extract, which contains acrylic acid, water, acetic acid, maleic acid, polyacrylic acids and small amounts of acrolein and formaldehyde, and freeing it therein under reduced pressure from the low boilers water, acetic acid, acrolein and formaldehyde; mixing the high boiler extract, which still contains acrylic acid, maleic acid and polyacrylic acids with 1.2 to 8 mols of a $C_4$ to $C_8$-alcohol, per mol acrylic acid, and passing the resulting mixture through a first reaction zone charged with the ion exchanger resin; distilling the resulting esterification mixture in a second distilling zone; removing a water/alcohol-azeotrope overhead, condensing it, separating the aqueous phase from the organic phase, and refluxing the organic phase to the second distilling zone; withdrawing, near the base portion of the second distilling zone, an anhydrous mixture comprised of the high boilers maleic acid ester, polyacrylic acids, polyacrylic acid esters and alcohol, acrylic acid esters and residual acrylic acid, and introducing the said anhydrous mixture into a second reaction zone charged with the ion exchanger resin; distilling the esterification mixture in a third distilling zone; removing an alcoholic acrylic acid ester solution overhead and working it up into pure acrylic acid ester having from 4 to 8 carbon atoms in its alcoholic component; withdrawing, near the base portion of the third distilling zone, the high boiler mixture, the quantity of which is increased during the process, and using it for scrubbing acrylic acid-containing reaction gas in the absorption zone.

4. The process of claim 2, wherein about 3 to 20% by weight of all of the high boilers are withdrawn from the high boiler cycle near the base portion of the third distilling zone, and freed by distillative treatment from undistillable residues, and the high boiler distillate is combined again with the high boiler cycle.

5. The process of claim 2, wherein the reaction gas coming from the propylene oxidation zone additionally contains propylene.

6. The process of claim 1, wherein the hot, acrylic acid-containing reaction gas is scrubbed using from 0.1 to 1 liter high boiler mixture, per normal cubic meter gas.

7. The process of claim 2, wherein residual gas, which is comprised substantially of unreacted propylene and/or acrolein, unreacted oxygen, steam, formaldehyde, hydrogen, carbon monoxide and carbon dioxide, and remains unabsorbed by the high boiler mixture in the absorption zone, is introduced into a cooling zone, in which reaction water in excess is condensed out together with formaldehyde and small amounts of acrolein, the residual gas being then recycled as a steam-saturated cycle gas and in combination with fresh oxygen and fresh propylene and/or acrolein to the catalyst-charged oxidation zone.

8. The process of claim 7, wherein a small portion—corresponding to the quantity of additional carbon oxides forming during each passage—of residual gas is withdrawn at a place above the absorption zone, freed from acrolein by scrubbing it with the high boiler mixture, the acrolein-free gas balance portion being burnt and the high boiler mixture being refluxed to the head of the absorption zone.

9. The process of claim 2, wherein the low boiler mixture, which is comprised of water/acetic acid/acrolein/formaldehyde and distilled off in the first distilling zone, is condensed to be supplied then to a stripping zone which is fed with fresh propylene and/or acrolein and in which the acrolein is expelled at 30 to 90° C. and supplied to the oxidation zone, the remaining low boiler constituents being withdrawn from the stripping column.

10. The process of claim 9, wherein the acrolein, which is expelled at 30 to 90° C. from the stripping zone fed with fresh propylene, is conveyed together with propylene to the oxidation zone.

11. The process of claim 7, wherein the reaction water in excess, which is condensed out from the residual gas together with formaldehyde and small amounts of acrolein, is combined with the low boiler mixture, which is distilled off from the first distilling zone and condensed, and the resulting combination is conveyed to the stripping zone.

12. The process of claim 3, wherein about 3 to 20% by weight of all of the high boilers are withdrawn from the high boiler cycle near the base portion of the third distilling zone, and freed by distillative treatment from undistillable residues, and the high boiler distillate is combined again with the high boiler cycle.

13. The process of claim 3, wherein the reaction gas coming from the propylene oxidation zone additionally contains propylene.

14. The processes of claim 3, wherein residual gas, which is comprised substantially of unreacted propylene and/or acrolein, unreacted oxygen steam, formaldehyde, hydrogen, carbon monoxide and carbon dioxide, and remains unabsorbed by the high boiler mixture in the absorption zone, is introduced into a cooling zone, in which reaction water in excess is condensed out together with formaldehyde and small amount of acrolein, the residual gas being then recycled as a steam-saturated cycle gas and in combination with fresh oxygen and fresh propylene and/or acrolein to the catalyst-charged oxidation zone.

15. The process of claim 14 wherein a small portion, corresponding to the quantity of additional carbon oxides forming during each passage, of residual gas is withdrawn at a place above the absorption zone, freed from acrolein by scrubbing it with the high mixture, the acrolein-free gas balance portion being burnt and the high boiler mixture being refluxed to the head of the absorption zone.

16. The process claim 3, wherein the low boiler mixture, which is comprises of water/acetic acid/acrolein/ formaldehyde and distilled off in the first distilling zone, is condensed to be supplied then to a stripping zone which is fed with fresh propylene and/or acrolein and in which the acrolein is expelled at 30 to 90° C. and supplied to the oxidation zone, the remaining low boiler constituents being withdrawn from the stripping column.

17. The process of claim 16, wherein the acrolein, which is expelled at 30 to 90° C. from the stripping zone fed with fresh propylene, is conveyed together with propylene to the oxidation zone.

References Cited

UNITED STATES PATENTS

| | | | |
|---|---|---|---|
| 3,420,751 | 1/1969 | Hougland et al. | 260—486 X |
| 3,470,238 | 9/1969 | Asano et al. | 260—486 |
| 3,470,239 | 9/1969 | Russell | 260—486 |

LEWIS GOTTS, Primary Examiner

P. J. KILLOS, Assistant Examiner

U.S. Cl. X.R.

260—485 R, 537 R